Patented Aug. 8, 1933

1,921,496

UNITED STATES PATENT OFFICE 1,921,496

PRODUCTION OF BENZANTHRONE DERIVATIVES

Ian Blohm Anderson, Robert Fraser Thomson, and John Thomas, Grangemouth, Scotland, assignors to Scottish Dyes, Limited, Grangemouth, Scotland No Drawing. Application June 18, 1928, Serial No. 286,483, and in Great Britain June 24, 1927

4 Claims. (Cl. 260—61)

This invention relates to the production of benzanthrone derivatives and more specifically to the production of isodibenzanthrone and isodibenzanthrone derivatives.

The main object of the present invention is to provide an improved or modified method for producing such bodies.

Heretofore isodibenzanthrone has usually been produced from Bzl' mono-halogen derivatives of benzanthrone, the condensation of the halogenbenzanthrone being carried out in the presence of alcoholic potash. Under certain conditions small quantities of isodibenzanthrone have been obtained from benzanthrone by the action of alcoholic potash, but in these cases the product is contaminated with a large amount of dibenzanthrone which materially affects the shades of materials dyed thereby.

We have now found that under certain conditions isodibenzanthrone can be obtained in a high state of purity direct from benzanthrone. This process offers marked technical advantages over the process which involves the use of Bzl' mono-halogen-benzanthrone, as benzanthrone is considerably cheaper than the mono-halogen-benzanthrone, and the production of the latter intermediate is unnecessary.

In addition we have found that substituted benzanthrones can be made to yield isodibenzanthrone derivatives with the exception apparently of those substituted benzanthrones which contain substituents in the 2- or Bzl-positions.

We have further found the surprising result that 2:2'-dibenzanthronyl or at least the body stated to be 2:2'-dibenzanthronyl will produce isodibenzanthrone as distinct from dibenzanthrone which is the body which it would be expected to produce.

The invention in brief consists in the preparation of benzanthrone derivatives particularly the preparation of isodibenzanthrone or isodibenzanthrone derivatives by the action of alkali for example powdered caustic potash, especially alcoholic alkali under the action of heat namely at temperatures between 80° C. and about 140° C. in an indifferent liquid such as kerosene, xylene or petrol, on benzanthrone or substituted benzanthrones which have the 2- and Bzl-positions free, or 2:2'-dibenzanthronyls and derivatives which have the 1:1' positions free.

The invention also consists in processes substantially as hereinafter described and in products which may be made by those processes or by their chemical equivalents.

The following examples illustrate how the invention may be carried into effect all parts being parts by weight:—

Example 1

20 parts of benzanthrone are added to 150 parts xylene to which has been previously added 20 parts of commercial ethyl alcohol and 70 parts of powdered caustic potash. The melt is well stirred and the temperature raised to 130° C. and maintained thereat for 2 hours.

The melt first thickens and then separates into two layers. The xylene layer becomes green then blue, and then violet with a red brown fluorescence.

The melt is diluted with hot xylene and filtered. The xylene removes unchanged benzanthrone and soluble condensation products. The residue consisting of dyestuff and potash is diluted with water, boiled, air-blown and filtered.

The yield of the crude material approaches the quantitative.

The product consists of a dark powder which dyes cotton from a blue vat with red brown fluorescence, violet shades which redden on moistening.

The solution in concentrated sulphuric acid is a clear green with a bluish tinge which on partial dilution turns blue and on further dilution precipitates violet flocks. The material coloured nitrobenzene violet with a red brown fluorescence.

Benzanthrone when treated by the above process appears to be practically completely converted to isodibenzanthrone because tests show the latter to be practically free from dibenzanthrone.

As has been indicated, after working up the isodibenzanthrone obtained dissolves for instance is strong sulphuric acid with a pure green solution, and on vatting in alkaline hydrosulphite it gives a pure blue vat, which test indicates practically complete absence of dibenzanthrone.

Example 2

If the benzanthrone of Example 1 be replaced by 6-methyl-benzanthrone of melting point 169.5° produced by the method of Scholl (Ann. 394, III (1913)) a product is obtained which consists of a blue-black powder. The solution in concentrated sulphuric acid is greenish-blue changed on partial dilution to bright blue, and then to violet on great dilution. The product gives a violet-blue vat with alkaline hydrosulphite, with a slight red fluorescence, and dyes cotton blue shades, which on oxidation change to violet. The product appears to consist substantially of 6:6'-dimethyl-isodibenzanthrone.

Example 3

The mixture of isomeric alpha-chlorbenzanthrones obtained by condensing 1-chloranthraquinone with glycerine in sulphuric acid solution can be separated to some extent into a high melting chlorbenzanthrone (melting point 180–181° C.) and a mixture melting at a considerably lower temperature.

The former on submitting to the process of Example 1 gives a dyestuff which appears to be largely contaminated with the dibenzanthrone type.

Using the lower melting mixture, however, the dyestuff obtained is substantially of the isodibenzanthrone type dissolving in concentrated sulphuric acid with a greenish-blue colour and giving a violet precipitate on dilution. In alkaline hydrosulphite it yields a blue vat which dyes cotton blue shades oxidising to violet.

Example 4

The crude dyestuff of Example 1 can be freed from impurities by treatment, for instance, with aniline or other aromatic bases. 10 parts of the crude dyestuff are boiled with 100 parts aniline for some time and the brownish-violet suspension is filtered while hot and the insoluble residue freed from aniline.

From the filtrate there crystallizes out a further crop of material which is substantially as pure as the crude material, but the insoluble residue is of a considerably higher degree of purity. It dissolves in concentrated sulphuric acid to give a bright greenish-blue solution, which on partial dilution gives a blue suspension, and on great dilution brilliant violet flocks. The alkaline hydrosulphite vat is pure corn-flower-blue with red fluorescence and cotton is dyed in this vat the characteristic blue shades which change to a bright reddish-violet on oxidation.

Example 5

The crude dyestuff of Example 1 may also be economically purified by extraction with light pyridine. In this case the extraction may be arranged either by boiling the crude dyestuff with light pyridine, in which case some of the colouring matter dissolves and may be recovered from the filtrate, while the major part remains in a substantially purer condition undissolved by the pyridine.

Alternatively the extraction may be carried out in an apparatus in which only the vapour condenses on the crude dyestuff whereby practically none of the colouring matter is dissolved, but only the impurities, and the extraction is carried out until the extracts running away from the crude dyestuff are perfectly free from colour due to impurities. The purified dyestuff obtained by either of these methods is substantially identical with the purer material described in the last example.

Example 6

The crude dyestuff of Example 1 may alternatively be purified by dissolving 10 parts in 100 parts of 85% sulphuric acid at 100° C. and allowing the greenish-blue solution to cool. By carrying out the cooling process slowly the purified dyestuff separates in the form of small aggregates of needles of a coppery lustre, and these may be filtered off in the usual way and washed with 85% sulphuric acid, followed by weaker acid, and finally with water.

The purified dyestuff consists of a bronzy crystalline powder dissolving readily in strong sulphuric acid with a bright greenish-blue colour, giving a blue suspension on partial dilution and violet flocks on great dilution. The alkaline hydrosulphite vat is pure cornflower-blue with red-brown fluorescence, and the dyeing properties are substantially as described above.

Example 7

The product of the condensation of 2-chloranthraquinone with glycerine and sulphuric acid when substantially freed from 2-chlorbenzanthrone by recrystallization from solvents, can be submitted to the process of Example 1. It then yields a dyestuff of the isodibenzanthrone type which is free from chlorine.

The solution in concentrated sulphuric acid is greenish-blue giving a blue suspension on partial dilution, and a blue-violet flocculent precipitate on great dilution. The alkaline hydrosulphite vat is of a blue-violet shade dyeing cotton blue shades which oxidize to violet.

Example 8

In this example the use of an alcohol other than ethyl alcohol is described.

10 parts benzanthrone are added to 75 parts xylene to which has been previously added 10 parts of isopropyl alcohol and 35 parts of powdered caustic potash. The melt is thoroughly well stirred and the temperature raised to 120–130° C. for 6 hours.

The melt behaves as in Example 1 and the product is worked up by distilling off the xylene with steam and filtering the diluted melt. The dyestuff is washed free from soluble matter and on drying yields a violet powder which dissolves in concentrated sulphuric acid with a greenish-blue colour giving the usual properties of the isodibenzanthrone type. The shades of violet obtained are slightly more blue than when ordinary ethyl alcohol is used.

Example 9

Other diluents than xylene may be employed, for instance kerosene, boiling up to 200° C. 20 parts of benzanthrone are added to 150 parts of kerosene to which has been previously added 20 parts of ethyl alcohol and 70 parts of powdered caustic potash. The temperature is then raised to 120–130° C. for 4 hours.

By removing the kerosene with steam and filtering the diluted melt a product is obtained which is substantially identical with that of Example 1, but contains a rather smaller proportion of pure isodibenzanthrone.

Example 10

Halogenated aromatic hydrocarbons may be employed as solvents for instance monochlorbenzene. Thus, if the xylene employed in Example 1 be replaced by a similar amount of monochlorbenzene a dyestuff is obtained which is practically identical in properties and yield with that described in Example 1.

Example 11

This example deals with 2:2'-dibenzanthronyl xylene and alcoholic alkali.

According to this example 20 parts of alcohol are run into 70 parts of potash and 175 parts of xylene at ordinary temperature. 20 parts of pure 2:2'-dibenzanthronyl are stirred in ½ hour and the temperature is raised gradually to 120–130° C. (1–2 hours). The melt becomes dark green and quite thick. After heating for some time at 120–130° the melt separates into two layers. The xylene layer changes to blue then to violet and finally becomes colourless, all dissolved dyestuff apparently being precipitated.

The upper solvent layer is decanted off. The potash layer is steam distilled to remove last traces of xylene, and the remaining violet solution is air-blown and filtered. The residue is washed alkali free and dried.

The yield of crude product appears to approach the theoretical.

In the reaction we recommend that the temperature should not exceed about 130° C. because otherwise apparently the production of dibenzanthrone is encouraged. The dyestuff content of the crude product may vary to some extent. The product if desired can be purified for instance by the methods indicated below.

*Example 12*

This is a modification of Example 11 in which benzene is employed instead of xylol.

According to this example the xylol of Example 11 is replaced by benzene. The reaction is carried out over a long time at a temperature of about 80° C. and results in a very good product.

*Example 13*

This is a modification of Example 11 in which methyl benzanthrone is employed.

According to this example the 2:2'-dibenzanthronyl of Example 11 is replaced by an equivalent weight of a 6- ( or 7-) methyl benzanthrone which may be obtained together with other isomers for instance by the condensation of 2-methyl antharquinone with glycerine.

*Example 14*

This is a further modification of Example 11 in which a halogenated benzanthrone is employed.

According to this example, the dibenzanthronyl of Example 11 is replaced by an equivalent weight of chlorbenzanthrone which may be derived from 1-chloranthraquinone.

*Example 15*

This is a method of purifying the product of the above examples for instance the product of Example 11.

According to this example the product is purified by extraction with nitrobenzene. The product of Example 11 thus purified consists of a dark powder which dissolves in concentrated $H_2SO_4$ to give a pure blue green solution, which on partial dilution changes to blue and on infinite dilution gives violet flocks. It dyes cotton from a pure violet blue vat with red-brown fluorescence, blue shades which oxidise to violet in the air.

*Example 16*

This is a modification of Example 15.

According to this example, advantage is taken of the solubility of the isodibenzanthrone in alkaline hydrosulphite.

The dibenzanthronyls and the benzanthrones do not readily dissolve in alkaline hydrosulphite so that by extraction for instance of the product of Example 11 with alkaline hydrosulphite the dibenzanthronyl and benzanthrones can be separated by filtration from the solution of the isodibenzanthrone dyestuff body.

*General*

In any of the above examples describing the preparation of dyestuff from benzanthrone, 2:2'-dibenzanthronyl may be substituted for the benzanthrone employed, when as a rule similar results are obtained somewhat more readily.

Other alcohols besides ethyl alcohol can be used for the reaction, and the reaction appears to proceed to a certain extent at temperatures as low as 80° C. Even at 80° C. on prolonging the heating isodibenzanthrone can be obtained.

Isodibenzanthrone such as may be prepared by the above processes may be used for dyeing and printing of cotton or other fibres by the usual methods.

In place of benzanthrone bodies referred to above as starting materials, for instance in place of the bodies set out in Examples 13 and 14 suitably substituted benzanthrones may be employed.

Having now described our invention, what we claim as new and desire to secure by Letters Patent is:—

1. The process for the production of iso-dibenzanthrone derivatives which consists in heating together to a temperature between about 80° C. and 140° C. a body selected from the group consisting of—(a) benzanthrone, (b) 2:2'-dibenzanthronyl, with an alcoholic alkali in the presence of a liquid inert with respect to the selected starting material and to alcoholic alkali.

2. A process as claimed in claim 1 in which the alcoholic alkali employed is a mixture of powdered caustic soda and an alcohol.

3. A process as claimed in claim 1 in which the inert liquid is chosen from the group consisting of kerosene, xylene and petrol.

4. The process for the production of isodibenzanthrone derivatives which consists in heating together to a temperature between about 80° C. and 140° C. a body selected from the group consisting of—(a) benzanthrone, (b) 2:2'-dibenzanthronyl, with an alcoholic alkali in amount not exceeding 3½ times the weight of benzanthrone derivative and in the presence of a liquid inert with respect to the selected starting material and to alcoholic alkali.

IAN BLOHM ANDERSON.
ROBERT FRASER THOMSON.
JOHN THOMAS.